Jan. 17, 1939. S. J. NORDSTROM 2,144,080

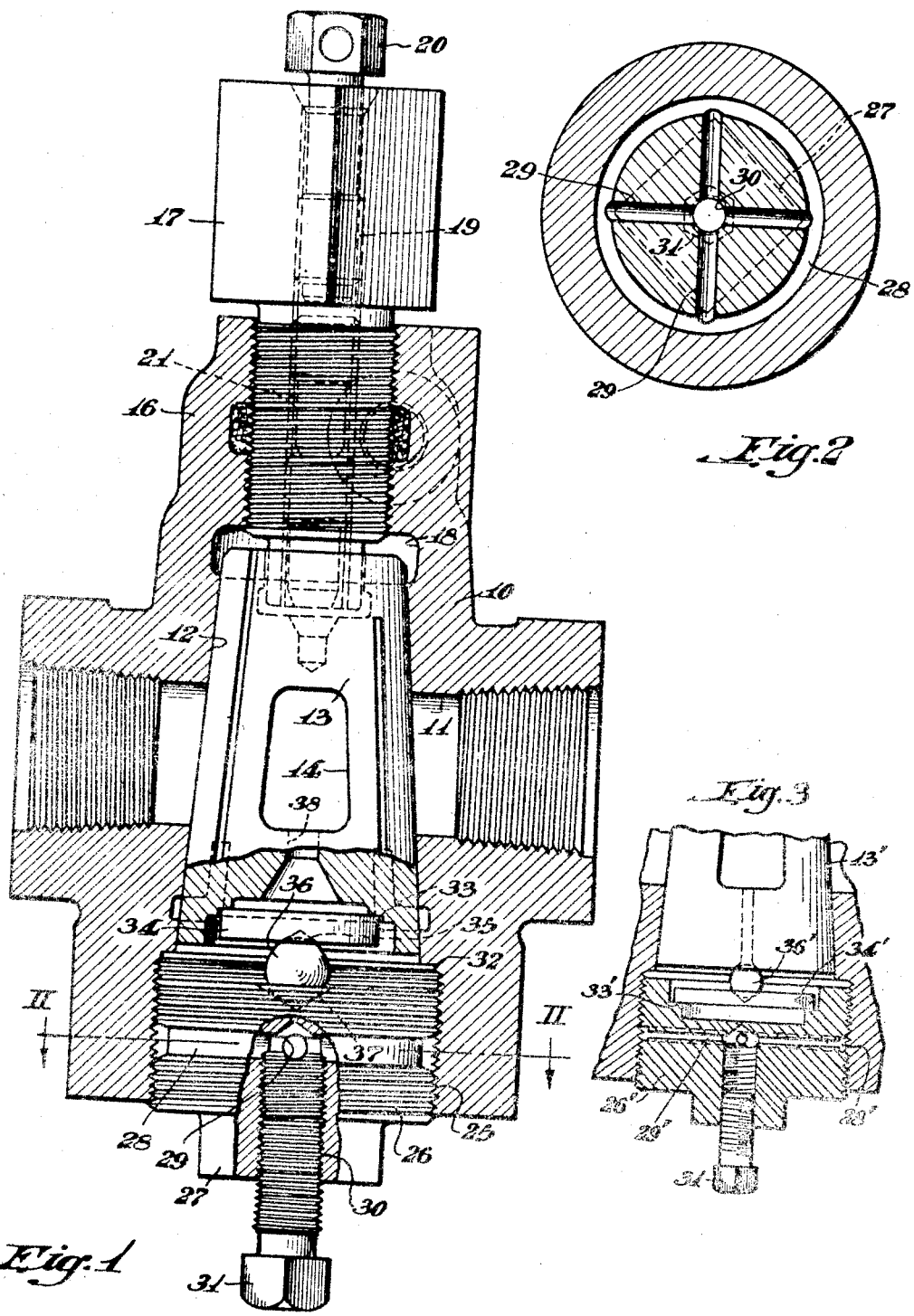

VALVE

Filed April 22, 1937 2 Sheets-Sheet 2

INVENTOR
Sven J. Nordstrom
BY Lewis D. Konigsford
ATTORNEY

Patented Jan. 17, 1939

2,144,080

UNITED STATES PATENT OFFICE 2,144,080

VALVE

Sven J. Nordstrom, Lafayette, Calif., assignor to Merco Nordstrom Valve Company, Pittsburgh, Pa., a corporation of Delaware Application April 22, 1937, Serial No. 138,399

14 Claims. (Cl. 251—93)

This invention relates generally to valves, and particularly to valves of the plug type. The invention in particular is an improvement on the construction shown in my prior U. S. Patent No. 1,932,322 issued October 24, 1933, and is a continuation in part of my copending application for Plug valve, Serial No. 81,291, filed May 22, 1936.

It is an object of the present invention to provide an improved sealing means having particular applicability to plug valves for closing the seat thereof.

A further object is the provision of an improved valve plug seating means for resiliently maintaining the valve plug on its seat, and adjusting the seating pressure thereof.

A further object is the provision of an improved valve plug seating means for resiliently maintaining the valve plug on its seat and adjusting the seating pressure thereof which is applicable to valves of large sizes.

A further object is the provision of an improved valve which is compact in construction and is inexpensive to manufacture.

According to the present invention one end of the valve seat is sealed by a threaded adjustment plug having a packing chamber interrupting the threads and provided with means for introducing viscous packing, lubricant or other plastic sealing means under pressure into this chamber to provide a seal for the threads. The valve plug is yieldingly maintained on its seat by a resilient plate or washer which in the preferred embodiment bears on the valve plug, and receives a thrust at its center from the threaded plug, as by the interposition of a ball or other suitable thrust transmitting means, so that the seating pressure on the valve plug may be adjusted by rotation of the threaded plug. The threaded plug may be threaded directly into the valve casing, or in a modification preferred for the larger sizes, the threaded plug may be threaded into a cover plate which in turn is threaded into the casing, and in this modification both the threaded adjustment plug and cover plate have their respective threaded connections interrupted by a packing chamber which is provided with viscous or plastic packing under pressure to provide a seal for the threads. In the preferred modification the line pressure is conducted to both sides of the resilient plate so that it need not be made much stronger than is necessary to resiliently hold the plug in its seat, as it does not have to withstand line pressure. The invention is particularly applicable to plug valves of the lubricant jacked type.

For a better understanding of the invention, reference will be had to the accompanying drawings wherein is shown by way of example a preferred modification of the invention and wherein:

Figure 1 is a vertical sectional view illustrating a valve incorporating the preferred embodiment of the present invention;

Figure 2 is a cross section taken on line II—II of Figure 1;

Figure 3 is a fragmentary view in vertical section of a modification;

Figure 4:
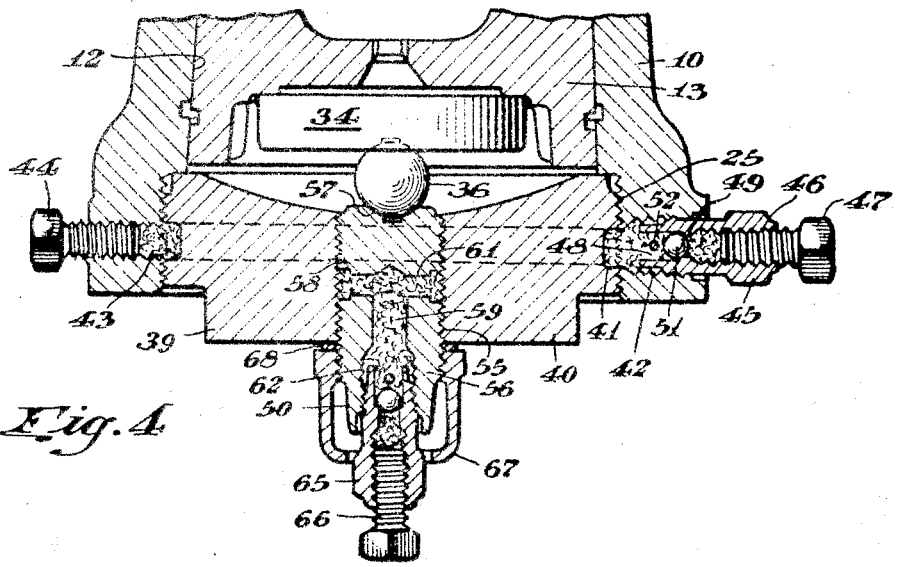
Figure 4 is a vertical section view of a further modification particularly adapted to larger sizes of valves.

Referring to the drawings, the valve comprises a body or casing 10 having a longitudinal passageway 11 therethrough for flow of fluid, said passageway being threaded or otherwise formed to be connected to a fluid pipe line in which the valve is to be employed. A tapered seat 12 is formed in the casing transversely of the passageway, and a tapered plug 13 is seated in the seat 12 and has a port 14 therethrough adapted to register with the passageway 11 for open position of the valve.

The casing 10 has an extension 16 at one end into which is threaded an operating stem 17 which is separate from the plug 13 and forms an operative connection therewith at the smaller end of the plug. Lubricant is supplied to a chamber 18 formed at the smaller end of the seat 12 through a threaded bore 19 in the valve stem, and the lubricant is placed under compression by means of the screw 20 threaded into the bore 19. One or more check valves 21 of suitable construction are provided in the bore 19 to prevent refluxing of lubricant.

The casing 10 at the larger end of the seat has a threaded bore indicated at 25, and a threaded plug or closure member 26 is threaded therein. The plug member 26 has a square end 27 by which it may be rotated, and has a groove 28 formed in its periphery intermediate its ends which communicates through radial passages 29 with a threaded bore 30 passing part way through the plug. A packing compressor or screw 31 is threaded into the bore 30. The threads 25 preferably are parallel running threads so that the plug 26 may be turned into the bore as far as desired until limited by a shoulder 32 at the inner end of the bore.

The valve plug 13 at its larger end is recessed to provide an internal step 33 upon which is seated a plate or washer 34 preferably made of cast steel or die forged steel or other suitable resilient material. A small recess 35 is formed in the center of the plate 34, and a steel ball 36 is interposed between the plate 34 and the threaded plug 26, and fits into a central conical recess 37 in the end of plug 26. An opening 38 is provided in the plug connecting with the port therethrough, and as plate 34 does not form a pressure tight joint with shoulder or step 33, the line pressure is exerted substantially equally on both sides of the resilient plate 34.

From the foregoing description it will be apparent that the plug is maintained on its seat by the thrust of threaded plug 26 resiliently transmitted by plate 34, and the thrust may be adjusted as desired by turning inwardly the screw plug 26 and forcing the ball 36 against the plate 34. As line pressure is exerted substantially equally on both sides of the plate 34, this plate need be made only strong enough to seat the plug, and does not have to additionally withstand the line pressure. The valve is jacked and lubricated by introducing a stick of lubricant into the bore 19 and inserting the threaded screw 20 into the bore and turning it inwardly whereby lubricant is introduced into the chamber 18 to jack the plug, and the lubricant is forced through the groove system formed on the plug surface and valve seat. The joint between the threaded plug 26 and the casing 10 is sealed by introducing packing material, such as a mixture of graphite, asbestos and an unctuous fluid or solid, into the bore 30 and forcing it by screw 31 into the annular chamber 28 so that the packing is forced along the threads both inwardly and outwardly. The resistance to flow of the packing which is very viscous, thus prevents the leakage of line fluid between the threads to the exterior of the valve. If desired, the threaded plug 26 may be locked in position by spot welding.

In the modification shown in Figure 3, the threaded plug 26' has a shoulder 33' upon which the resilient plate 34' rests without forming a fluid tight bearing thereon, and a ball 36' is interposed between the plug 13' and the plate 34' to transmit the resilient thrust of the plate 34'. The packing groove 28' interrupts the threads in the casing and the diametrical holes 29' in the plug conduct packing material thereto.

In the modification shown in Figure 4, wherein like parts are correspondingly numbered, the larger end of the valve casing has a threaded bore 25 in which is located a threaded closure plate 40 having a non circular boss 39 thereon. A circumferential groove 41 interrupts the cylindrical threaded surface of the closure plate and is supplied with suitable plastic packing material through a plurality of radial bores 42 and 43 in the valve casing 10 arranged about the perimeter. One or more bores 43 may be provided, these bores being threaded and having a suitable adjustable packing compression screw 44 fitted therein. At least one or more bores 42 are provided which receive a combined check valve and compression screw fitting comprising a check valve body 45 threaded therein and having a threaded bore 46 extending therethrough into which is fitted an adjustable packing compression screw 47. The check valve body 45 has a counterbore 48 and a connecting bore 49 connecting the bores 46 and 48, the connecting bore 49 being controlled by a steel ball 51 or other suitable closure member retained against escape by a pin 52 passing transversely through the body 45 and bore 48 or in any other suitable manner. The packing in the recess 41 may be renewed through the check valve fitting 45 by removing screw 47, inserting a stick of packing in the bore 46 and replacing the screw 47 to force the plastic packing through bore 49 past the ball 51 and into the groove 41. The ball 51 allows packing to flow from the bore 46 to bore 48 but prevents return flow of the packing. When there is ample packing in this recess it may be compressed merely by turning in the screws 44 or 47 or both to prevent leakage through bore 25.

The center of plate 40 has a threaded bore 55 therein in which there is threaded a sealing and adjusting plug 56 with a non circular portion 50 and having a recess 57 at its inner end in which is located the thrust ball 36. The threads of the adjusting member 56 which are parallel, are interrupted by a recess 58 and communicate with a central bore 59 by means of radial bores or channels 61. The central bore 59 terminates in a threaded enlarged bore 62 in which is screwed a suitable combined check valve and applicator fitting 65 exactly like the fitting 45, having a screw 66 therein. The adjustment plug 56 receives a cap 67 threaded thereover and a suitable gasket 68 is interposed between the cap 67 and plate 40.

The cap 67 may be permanently secured against accidental adjustment by a spot weld or any other suitable manner which may be readily broken when desired to allow adjustment of the seating pressure on the plug. The threaded joint between plate 40 and adjustment plug 56 is sealed by the plastic packing in groove 58 supplied thereto through the check valve fitting 65, and the pressure of the packing can be adjusted by means of screw 66. This modification is particularly adapted to the construction of larger valves for higher pressure, and enables the thrust of the plug to be readily adjusted without having to turn the main plate 40, which because of its size would be unwieldly to adjust. Also this construction eliminates the necessity for a flange at the larger end of the plug or the need for bolts for securing the cover in position and thereby permits a more compact construction for the valve.

Figure 5:
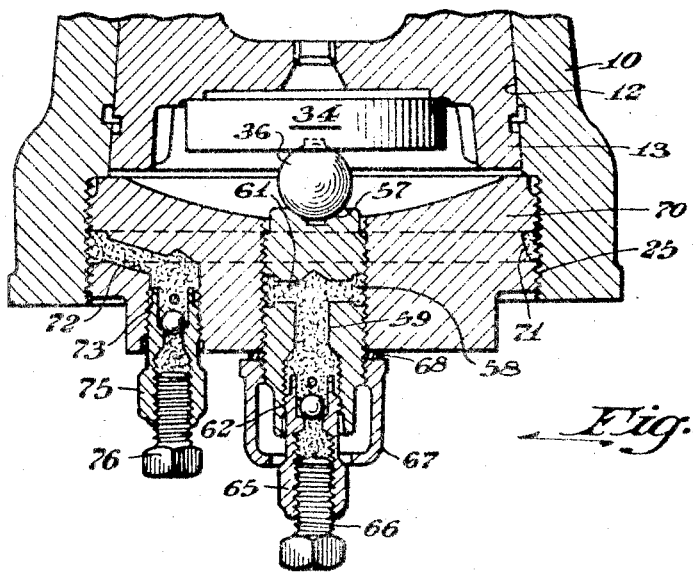
Figures 5 and 6 are vertical sectional views respectively of still further modifications.

In the modification shown in Figure 5, wherein like parts are correspondingly numbered, the threaded bore 25 is closed by a closure plate 70 having a circumferential groove 71 interrupting the cylindrical threaded surface of the closure plate, this groove being deeper at its inner end. The groove 71 is supplied with suitable packing material through one or more radial bores 72 in the plate 71 communicating with a threaded longitudinal bore 73 which receives a combined check valve and compression screw fitting comprising a threaded check valve body 75 having a compression screw 76. The check valve body 75 is exactly like the bodies 45 and 65 hereinbefore described. Packing is supplied to the groove 71 through check valve fitting 75 and because of the tapered depth of the groove any internal pressure developed tends to wedge the packing more tightly in the groove.

Figure 6:
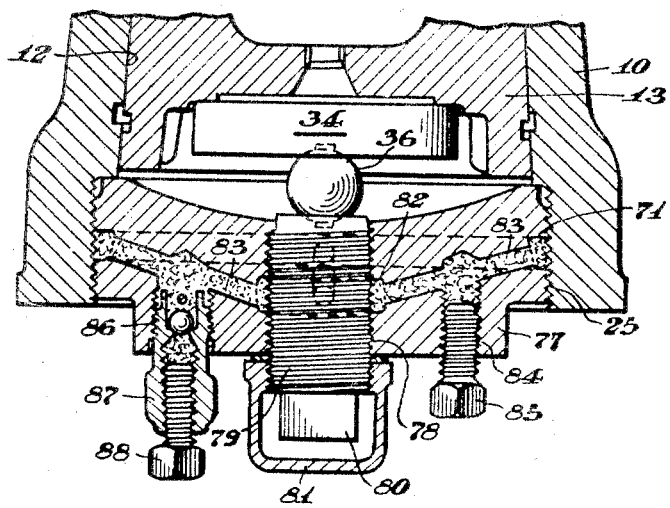

In the modification shown in Figure 6, the threaded bore 25 receives a threaded closure plate 77 having a tapered recess 71 in its outer periphery as hereinbefore described, and has a central threaded bore 78 which receives a threaded adjusting screw 79. The adjusting screw 79 has a non circular portion 80 at its outer end whereby it may be grasped by a wrench or other implement whereby it may be turned, and is covered by a cap 81 threaded thereon and suitably secured in place. A circumferential groove 82 is formed in the center bore 78 of the cover 77 and is connected with the circumferential recess 71 by means of a plurality of substantially radially extending channels 83 formed in the cover. One or more threaded bores 84 are formed in the cover communicating with some of the radial channels 83, and receive a packing compression screw 85 whereby the packing in recesses 71 and 82 may be compressed. Also one or more threaded bores 86 are provided in the cap 77 communicating with some of the radial channels 83 and which receive a check valve body 87 having an adjusting screw 88 therein, the check valve body 87 being exactly like those previously described.

This construction permits the simultaneous adjustment of the pressure in packing recesses 71 and 82 by one adjusting screw, as adjustment of compression screw 85 forces packing through the radial channels 83 into the recesses 71 and 82. The packing for either or both of these recesses may be renewed through the check valve body 87 in a manner similar to that hereinbefore described.

The invention may be embodied in other specific forms without departure from the spirit or essential characteristics thereof, and the present preferred embodiment is thereby to be construed as illustrative rather than restrictive of the invention.

What is claimed and desired to be secured by United States Letters Patent is:

1. A valve comprising a casing having a passageway therethrough for flow of fluid and a seat formed transversely of the passageway, a tapered valve plug seated in said seat, a resilient plate at the larger end of the plug supported by the plug, said plate being mounted to allow line fluid pressure to be exerted substantially equally on both sides of the plate, and means for adjusting the thrust of said plate against the plug to resiliently seat said plug.

2. A valve comprising a casing having a passageway therethrough for flow of fluid and a seat formed transversely of the passageway, a valve plug in said seat having a port therethrough adapted to register with the passageway in open position of the valve, a resilient element having a portion bearing against the larger end of the plug, a threaded bore in the casing extending from the exterior to the valve seat, a cover threaded into said bore, there being a recess interrupting the threaded engagement of said threaded bore and cover, means for introducing plastic sealing material under pressure to said recess to seal the joint between the said cover and casing, said cover having a substantially central threaded bore and a threaded adjustment plug in said bore, there being a recess interrupting the threaded engagement of said adjustment plug and its bore, means for introducing plastic sealing material under pressure to said latter recess to seal the joint between said adjustment plug on cover, and means transmitting the thrust of said adjustment plug against said resilient element to resiliently urge the plug into its seat.

3. A valve in accordance with claim 2 having common means for introducing plastic sealing material under pressure to both of said recesses to seal the respective threaded joints.

4. A valve according to claim 2 having check valve fittings for supplying plastic sealing material to said recesses.

5. A valve comprising a casing having a passageway therethrough for flow of fluid and a seat formed transversely of the passageway, a valve plug in said seat having a port therethrough adapted to register with the passageway in open position of the valve, a resilient element having a portion bearing against the larger end of the plug, a threaded bore in the casing extending from the exterior to the valve seat, a plug threaded into said bore and operatively bearing on said resilient element, there being a recess interrupting the threaded engagement of the threaded plug and bore, a check valve fitting in said threaded plug, and a compression screw in said check valve fitting for introducing plastic sealing material under pressure to said recess to seal the joint between said threaded plug and casing.

6. A valve comprising a casing having a passageway therethrough for flow of fluid and a seat formed transversely of the passageway, a valve plug in said seat having a port therethrough adapted to register with the passageway in open position of the valve, a threaded bore in the casing extending from the exterior to the valve seat, a removable cover adjustably threaded into said bore and operatively bearing on one end of said valve plug, there being a recess interrupting the threaded engagement of said threaded bore and cover, means for introducing plastic non-setting sealing material under pressure to said recess to seal the joint between said cover and casing.

7. A valve comprising a casing having a passageway therethrough for flow of fluid and a seat formed transversely of the passageway, a valve plug in said seat having a port therethrough adapted to register with the passageway in open position of the valve, a threaded bore in the casing extending from the exterior to the valve seat, a cover threaded into said bore, there being a recess interrupting the threaded engagement of said threaded bore and cover, means for introducing plastic sealing material under pressure to said recess to seal the joint between the said cover and casing, said cover having a substantially central threaded bore communicating with the space formed between said cover and valve plug and a threaded adjustment plug in said bore operatively bearing on said valve plug, there being a recess interrupting the threaded engagement of said adjustment plug and its bore, and means for introducing plastic sealing material under pressure to said latter recess to seal the joint between said adjustment plug and cover.

8. A valve comprising a casing having a passageway therethrough for flow of fluid and a seat formed transversely of the passageway, a valve plug in said seat having a port therethrough adapted to register with the passageway in open position of the valve, a threaded bore in the casing extending from the exterior to the valve seat, a cover threaded into said bore and sealed with respect to said casing, said cover having a substantially central threaded bore communicating with the space formed between said cover and valve plug, and a threaded adjustment plug in said bore operatively bearing on an end of said valve plug, there being a recess between said adjustment plug and its bore, and means for introducing plastic sealing material under pressure to said recess to seal the joint between said adjustment plug and cover.

9. A valve in accordance with claim 7 having common means for introducing plastic sealing material under pressure to both of said recesses to seal the respective threaded joints.

10. A valve comprising a casing having a passageway therethrough for flow of fluid and a seat formed transversely of the passageway, a valve plug in said seat having a port therethrough adapted to register with the passageway in open position of the valve, a resilient element having one portion bearing against the larger end of the plug, a threaded bore in the casing extending from the exterior to the valve seat and communicating therewith, a plug adjustably threaded into said bore and bearing on said resilient element, there being a recess interrupting the threaded engagement of the threaded plug and bore, and means for introducing plastic sealing material under pressure to said recess to seal the joint between said plug and casing.

11. A valve comprising a casing having a passageway therethrough for flow of fluid and a seat formed transversely of the passageway, a tapered valve plug seated in said seat having a port therethrough adapted to register with the passageway in open position of the valve, a resilient plate at the larger end of the plug supported adjacent its periphery and having a substantially centrally disposed notch, a ball thrust member in said notch, a plug threaded into the casing against said ball for adjusting the thrust on said ball, said threaded plug having a peripheral recess formed intermediate the threads, and means for introducing plastic sealing material under pressure into said recesses to seal the joint between the threaded plug and casing.

12. A valve comprising a casing having a passageway therethrough for flow of fluid and a seat formed transversely of the passageway, a tapered valve plug seated in said seat having a port therethrough adapted to register with the passageway in open position of the valve, a resilient plate at the larger end of the valve plug supported at its periphery and having a substantially centrally disposed notch, a ball thrust member in said notch, a plug threaded into the casing against said ball for adjusting the thrust on said ball, said threaded plug having a peripheral recess formed intermediate the threads, means for introducing plastic sealing material under pressure into said recesses to seal the joint between the threaded plug and casing, and means for supplying lubricant under pressure to jack the valve plug from its seat.

13. A valve comprising a casing having a passageway therethrough for flow of fluid and a seat formed transversely of the passageway, a tapered valve plug seated in said seat, a resilient metal plate adapted to be flexed and bearing on the larger end of the plug, a threaded bore in the casing extending from the exterior to the valve seat, a threaded plug in said threaded bore and providing a recess at its periphery intermediate said threads, means for introducing a plastic sealing material under pressure to said recess to seal the joint between the threaded plug and casing, and a thrust member interposed between said threaded plug and resilient plate for resiliently seating said valve plug.

14. A valve comprising a casing having a passageway therethrough for flow of fluid and a seat formed transversely of the passageway, a valve plug in said seat, an inherently resilient substantially circular plate adapted to be flexed and bearing against the larger end of the plug with its periphery unconfined, and a plug threaded through the casing and bearing against said plate whereby the seating thrust of the plate on the valve may be adjusted by adjusting the threaded plug.

SVEN J. NORDSTROM.